(No Model.)
C. E. BUELL.
GALVANIC BATTERY.
No. 523,758.   Patented July 31, 1894.
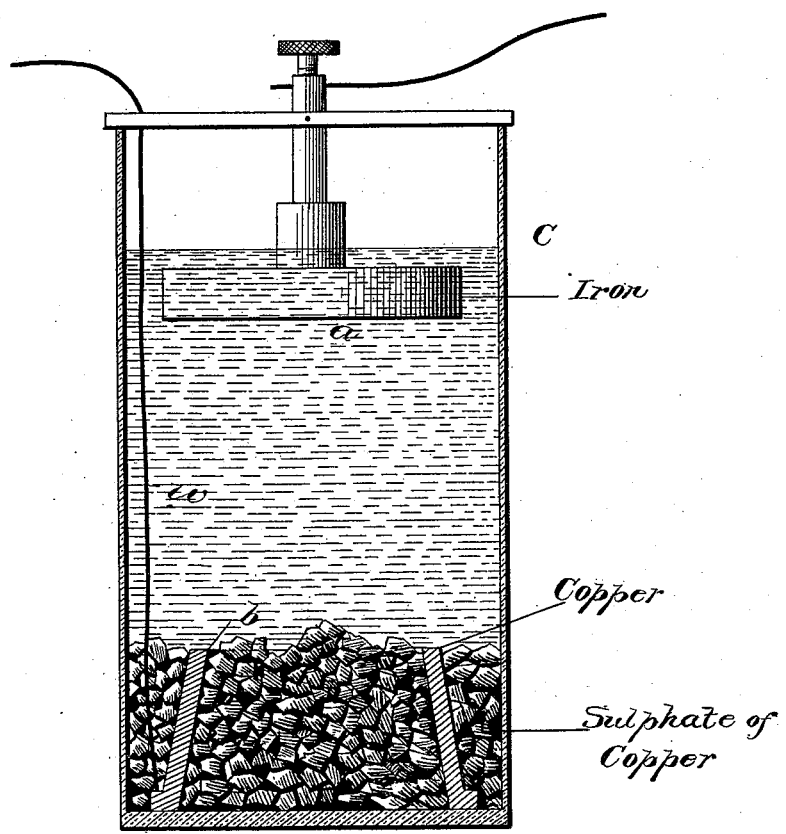
Witnesses:
J. M. Fowler Jr.
W. C. Buell
Inventor:
Charles E. Buell

UNITED STATES PATENT OFFICE.

CHARLES E. BUELL, OF NORTH PLAINFIELD, NEW JERSEY.

GALVANIC BATTERY.

SPECIFICATION forming part of Letters Patent No. 523,758, dated July 31, 1894.

Application filed December 24, 1892. Serial No. 456,267. (No model.)

*To all whom it may concern:*

Be it known that I, CHARLES E. BUELL, of North Plainfield, Somerset county, State of New Jersey, have invented Improvements in Galvanic Batteries, of which the following is a specification.

My invention consists essentially, in a battery cell containing an iron top plate and a copper bottom plate, together with undissolved crystals of copper sulphate and water, substantially as hereinafter described.

In the drawing my battery is represented as consisting of a glass cup C. a plate of iron *a.* suspended near the top of the cup, a copper electrode *b.* at the bottom of the cup that is provided with an insulated conducting wire *w.* for connecting the said bottom plate to an instrument, or to another battery. Means for connecting a wire to the iron top plate are also provided, and there is shown a mass of the crystals of the salt, sulphate of copper; known as blue vitriol, surrounding the bottom plate *b* of the battery thus organized. The bottom plate, top plate, and the wires connected thereto are similar to the ones used in a like manner of gravity battery employing a zinc top plate.

By the addition of water to cover the top plate the battery is provided with its solution; but it is usual to place the battery on a short circuit for a few hours to produce the desired action, or to hasten the action.

The addition of a metallic sulphate as sulphate of zinc, iron, magnesia, or aluminium of less specific gravity than the sulphate of copper hastens the action of the battery when it is first put in use.

The lighter salt is put in the cell after it is filled, and can be placed on the iron plate. The operation of this arrangement of elements is that the iron top plate is slowly dissolved and an electric current of great steadiness and holding power is generated.

The object of my invention is to reduce the cost of constructing and maintaining gravity batteries and to increase the steadiness of the current and the endurance of the battery. This object I accomplish by the invention above described, and for which—

I desire to make the following claim:

A gravity battery consisting of a vessel charged with undissolved sulphate of copper and water and provided with a copper electrode and an iron electrode.

CHARLES E. BUELL.

Witnesses:
A. C. BUELL.
WILLIAM C. BUELL.